United States Patent
Shin et al.

(10) Patent No.: US 9,160,023 B2
(45) Date of Patent: Oct. 13, 2015

(54) REINFORCED MATRIX IMPREGNATED WITH ELECTROLYTES FOR MOLTEN CARBONATE FUEL CELL AND FABRICATION METHOD THEREOF

(75) Inventors: Mi Young Shin, Daejeon (KR); Bo Hyun Ryu, Daejeon (KR); Hwan Moon, Seongnam-si (KR); Ju Young Youn, Daejeon (KR); Chang Sung Jun, Daejeon (KR); Tae Won Lee, Daejeon (KR); Kil Ho Moon, Daejeon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 463 days.

(21) Appl. No.: 13/127,027

(22) PCT Filed: Oct. 29, 2009

(86) PCT No.: PCT/KR2009/006280
§ 371 (c)(1),
(2), (4) Date: Aug. 8, 2011

(87) PCT Pub. No.: WO2010/050752
PCT Pub. Date: May 6, 2010

(65) Prior Publication Data
US 2011/0287333 A1 Nov. 24, 2011

(30) Foreign Application Priority Data
Oct. 29, 2008 (KR) .................. 10-2008-0106712

(51) Int. Cl.
H01M 8/14 (2006.01)
H01M 8/02 (2006.01)

(52) U.S. Cl.
CPC ............ *H01M 8/145* (2013.01); *H01M 8/0295* (2013.01); *H01M 2300/0051* (2013.01); *Y02E 60/526* (2013.01)

(58) Field of Classification Search
USPC .......................................... 429/472–478, 535
See application file for complete search history.

(56) References Cited

U.S. PATENT DOCUMENTS

| 4,322,482 A | * | 3/1982 | Bushnell et al. ............... 429/478 |
| 5,453,101 A | * | 9/1995 | Ong ............................... 29/623.5 |
| 5,580,673 A | * | 12/1996 | Farooque et al. ............. 429/478 |

FOREIGN PATENT DOCUMENTS

| JP | 10-097861 | 4/1998 |
| JP | 10112329 | 4/1998 |

(Continued)

OTHER PUBLICATIONS

Machine Translation of Norihito et al. (JP H10-097861, published Apr. 1998, pp. 1-13).*

(Continued)

*Primary Examiner* — Basia Ridley
*Assistant Examiner* — Caitlin Wilmot
(74) *Attorney, Agent, or Firm* — Sughrue Mion, PLLC

(57) ABSTRACT

The present invention relates to an electrolyte-impregnated, reinforced matrix for molten carbonate fuel cells and a manufacturing method thereof. According to the invention, the electrolyte-impregnated matrix, which comprises both the electrolyte and the reinforcing particles including a metal and an oxide, is manufactured by adding the electrolyte, as required per unit cell of a fuel cell, and the reinforcing particles including the metal and the oxide, to a slurry during the matrix preparation step, and subjecting the resulting slurry to a tape casting process. By doing so, the matrix stacking operation is facilitated, and the matrix manufacturing process is simplified. In addition, cracking caused by the difference in thermal expansion coefficient between an electrolyte sheet and the matrix can be suppressed, and thermal shock occurring during operation of the fuel cell stack can be reduced, thus improving the performance and lifetime of the fuel cell.

9 Claims, 2 Drawing Sheets

(56) References Cited

FOREIGN PATENT DOCUMENTS

| | | |
|---|---|---|
| JP | 10233222 | 9/1998 |
| KR | 20010038320 | 5/2001 |
| KR | 1020060099636 | 9/2006 |
| KR | 100759831 | 9/2007 |
| KR | 100778741 | 11/2007 |
| WO | 98/26465 A1 | 6/1998 |

OTHER PUBLICATIONS

Machine Translation of Chao et al. (JP H10-233222, published Sep. 1998, pp. 1-14).*
Machine Translation of Morohiro et al. (JP H10-112329, published Apr. 1998, pp. 1-19).*
German Office Action dated Feb. 13, 2014 issued in corresponding German Patent Application No. 11 2009 002 616.8.

* cited by examiner

REINFORCED MATRIX IMPREGNATED WITH ELECTROLYTES FOR MOLTEN CARBONATE FUEL CELL AND FABRICATION METHOD THEREOF

TECHNICAL FIELD

The present invention relates to an electrolyte-impregnated, reinforced matrix for molten carbonate fuel cells and a manufacturing method thereof, and more particularly to a method in which electrolyte powder and reinforcing particles are added to slurry during a process of manufacturing a matrix for a molten carbonate fuel cell stack so as to reinforce the matrix, thereby improving the mechanical stability of the stack, and a matrix manufactured therefrom.

BACKGROUND ART

In a conventional method, stacked unit cells are fabricated by mixing a binder and additives by a wet process to prepare a slurry, subjecting the slurry to tape casting to prepare an electrolyte sheet, and stacking the electrolyte sheet between an air electrode, a fuel electrode and a matrix to supply the electrolyte to each cell.

However, the use of this method has disadvantages in that, because the electrolyte sheet is melted during pretreatment of the fuel cell stack so as to be absorbed into the pores of the air electrode, the fuel electrode and the matrix, the total height of the stack is reduced by the height of the melted electrolyte sheet to reduce the mechanical stability of the stack, and non-uniform melting of the electrolyte which occurs during the pretreatment process makes the surface pressure distribution of the stack non-uniform, thus further increasing the mechanical instability of the stack.

In the above conventional method, because the electrolyte thermally expands at a rate greater than the matrix during pretreatment and melts at the melting temperature to permeate into the matrix, it can cause the thin plate shaped matrix having low strength to crack. The organic material in the matrix sheet disappears due to decomposition during the pretreatment process, but the matrix sheet has no chemical bond between the sintered particles, and thus has low strength. Thus, the matrix sheet is more likely to crack than the electrode, and for this reason, gas crossover between the fuel electrode and the air electrode will occur, thus adversely affecting the performance and lifetime of the fuel cell stack.

In attempts to overcome the above-described disadvantages, Korean Patent Application Nos. 10-1999-0046201, 10-2005-0020973, 10-2006-0112314 and 10-2006-0132459 disclose a method of using ceramic fiber as a reinforcing material to increase the thermal stability of the matrix, or using a sintering aid so as to be capable of increasing the bonding strength between the matrix particles at the operating temperature of the molten carbonate fuel cell, or adding a porous metal support.

However, in the method of using the ceramic fiber, agglomeration of the fiber occurs during the slurry preparation process, or the fiber is oriented in the direction of movement of the matrix sheet, so that defects occur during production of the matrix, thus reducing the production yield. Also, the matrix provided according to this method has low resistance against the differential pressure between the air electrode and the fuel electrode, indicating that this method does not yield the expected effect. Meanwhile, in the method of using the sintering aid, the bonding strength between the matrix particles shows a tendency to increase, but the fine pores of the matrix are changed to reduce the capillary force, so that the matrix cannot retain an electrolyte. Meanwhile, in the method of using the porous metal support, the high surface pressure that is applied during the stacking process causes high stress around the support, indicating the support shows an adverse effect during pretreatment. As a result, although the above-described methods aim to increase the mechanical strength of the matrix, these methods do not present a complete solution.

DISCLOSURE

Technical Problem

Accordingly, the present inventors have made efforts to solve the above-described problems and have manufactured an electrolyte-impregnated matrix, which comprises an electrolyte and reinforcing particles including a metal and an oxide, by adding the electrolyte, as required per unit cell of a molten carbonate fuel cell, and the reinforcing particles including the metal and the oxide, to a slurry during a matrix preparation step, and subjecting the resulting slurry to a tape casting process, thereby completing the present invention.

Technical Solution

It is, therefore, an object of the present invention to provide a method of manufacturing an electrolyte-impregnated, reinforced matrix for molten carbonate fuel cells, in which an electrolyte and reinforcing particles including a metal and an oxide are added together to slurry during the manufacturing of the matrix, whereby the matrix can supply the electrolyte to each cell, can have increased strength and stability, can eliminate the need for a separate electrolyte sheet, and can reduce heat shock occurring during operation of the fuel cell stack.

Another object of the present invention is to provide an electrolyte-impregnated, reinforced matrix, which comprises both an electrolyte and reinforcing particles including a metal and an oxide, and thus supply the electrolyte to each cell, which can have increased strength and stability, can eliminate the need for a separate electrolyte sheet, and can reduce heat shock occurring during operation of the fuel cell stack.

Advantageous Effects

According to the present invention, the electrolyte-impregnated matrix, which comprises both the electrolyte and the reinforcing particles including a metal and an oxide, is manufactured by adding the electrolyte, as required per unit cell of a fuel cell, and the reinforcing particles including the metal and the oxide, to slurry during the matrix preparation step, and subjecting the resulting slurry to a tape casting process. By doing so, the matrix stacking operation is facilitated, and the matrix manufacturing process is simplified. In addition, cracking caused by the difference in thermal expansion coefficient between an electrolyte sheet and the matrix can be suppressed, and thermal shock occurring during operation of the fuel cell stack can be reduced, thus improving the performance and lifetime of the fuel cell. Thus, the present invention has very excellent effects.

BEST MODE

Figure 1:
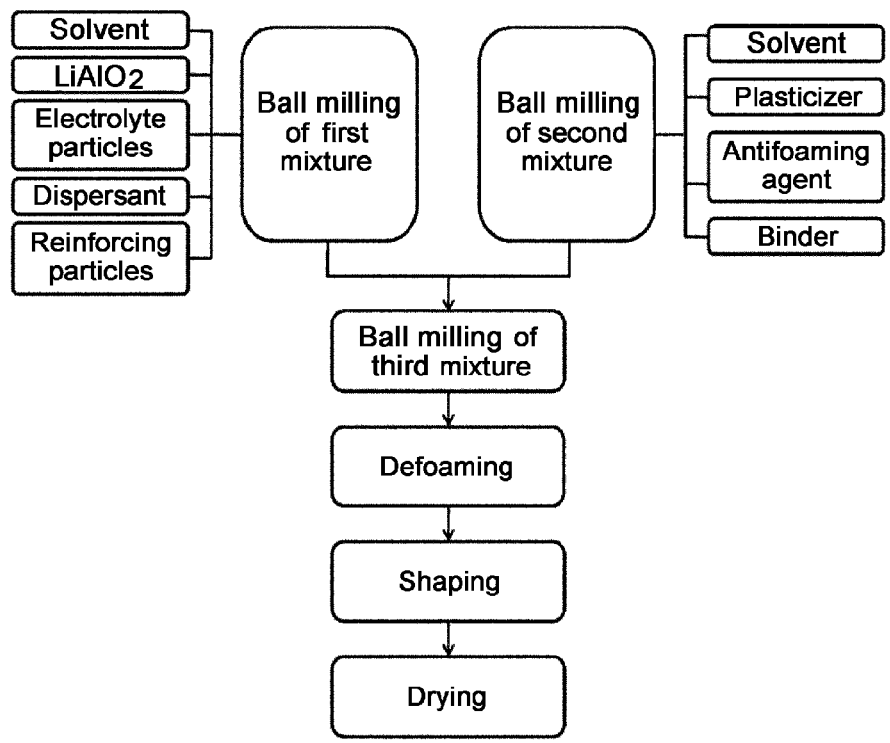
FIG. 1 is a flowchart schematically showing a process of manufacturing an electrolyte-impregnated, reinforced fuel cell for molten carbonate fuel cells according to the present invention.

The present invention relates to a method of improving the control of an electrolyte and the mechanical and chemical stability of a matrix, which is a support for a molten carbonate fuel cell, by adding electrolyte particles and reinforcing particles of various shapes including a metal and an oxide during the manufacturing of the matrix.

In a conventional method of manufacturing an MCFC cell, a matrix sheet is manufactured in a separate process and stacked into layers between a fuel electrode and an air electrode. Unlike this, the present invention provides a method of manufacturing an electrolyte-impregnated, reinforced matrix, which eliminates the need for an electrolyte sheet, by adding electrolyte particles during a slurry preparation step.

The present invention provides an electrolyte-impregnated, reinforced matrix in which metal and oxide particles of various sizes are added as reinforcing particles to $LiAlO_2$ (α,γ phase) that is the main component of the matrix, so that the matrix becomes denser through a reaction between the reinforcing particles and the electrolyte during pretreatment and has high mechanical strength, and in which the electrolyte is impregnated so that the matrix includes a portion of the amount of electrolyte required for an internal reforming cell while the distribution of the electrolyte therein is uniform.

In the present invention, fine electrolyte powder added to the matrix is melted so that it produces fine pores in the matrix and easily reacts with the reinforcing particles. As a result of the reaction, the electrolyte powder produces fine pores of 0.5 μm or less that function to prevent the production and progress of large cracks.

In the present invention, the reinforcing metal particles serve to react with the electrolyte so that their volume is expanded to increase the internal stress of the matrix, thus making the fine pore structure of the matrix denser. The reinforcing oxide particles serve as a barrier to relieve the stress produced by the reaction of the reinforcing metal particles and to inhibit the growth and progress of cracks, thus reducing thermal shock capable of occurring during operation of a fuel cell stack, thereby improving the performance and lifetime of the fuel cell.

The present invention provides an electrolyte-impregnated, reinforced matrix for molten carbonate fuel cells, which comprises $LiAlO_2$ that is the main component of the matrix, an electrolyte, reinforcing metal particles, and reinforcing oxide particles.

In a preferred embodiment of the present invention, the composition ratio between $LiAlO_2$, the electrolyte, the reinforcing metal particles and the reinforcing oxide particles, which are contained in electrolyte-impregnated, reinforced matrix for molten carbonate fuel cells, may vary depending on the amount of electrolyte impregnated or the kind of metal particles. A specific example of the composition ratio is described in the Examples below.

A method of manufacturing an electrolyte-impregnated, reinforced matrix for molten carbonate fuel cells according to a preferred embodiment of the present invention comprises steps of:

mixing $LiAlO_2$, an electrolyte, a dispersant, reinforcing metal particles and reinforcing oxide particles in a solvent to prepare a first mixture, and ball-milling the first mixture to prepare a powder slurry;

dissolving a plasticizer, an antifoaming agent and a binder in a solvent to prepare a second mixture, and ball-milling the second mixture to prepare a binder solution;

mixing the powder slurry and the binder solution to prepare a third mixture, and ball-milling the third mixture to prepare a slurry;

defoaming the slurry obtained by ball-milling the third mixture;

shaping the defoamed slurry; and drying the shaped slurry.

In a preferred embodiment of the present invention, the defoamed slurry may be shaped by tape casting.

Hereinafter, the present invention will be described in further detail with reference to the accompanying drawings.

FIG. 1 is a flowchart schematically showing a process for manufacturing a reinforced matrix impregnated with electrolytes for molten carbonate fuel cells according to the present invention.

As shown in FIG. 1, a dispersant is dissolved in a solvent, after which $LiAlO_2$ particles, an electrolyte and reinforcing particles are added thereto, and the mixture is ball-milled. After the ball milling process, an additional ball milling process is carried out to make an organic slurry required to form a matrix. The additional ball milling process comprises mixing a binder, a plasticizer and an antifoaming agent in a solvent at a predetermined ratio. The slurries prepared by the ball milling processes are mixed with each other by milling. The resulting mixed slurry is subjected to a defoaming process to remove bubbles and to adjust the viscosity. The viscosity-adjusted slurry is shaped and dried.

In a preferred embodiment of the present invention, each of the milling processes is carried out at the optimum speed selected depending on the diameter of the milling container, and the size of milling balls can be selected from a wide range of 5 mm to 3 cm in view of the size of the milling container and the properties of the particles.

In a preferred embodiment of the present invention, the electrolyte may be a mixture of two or more carbonates selected from the group consisting of $Li_2CO_3$, $K_2CO_3$ and $Na_2CO_3$.

In a preferred embodiment of the present invention, the electrolytes have a size of 0.1-1 μm.

In a preferred embodiment of the present invention, the electrolyte may be added in an amount corresponding to 20-100% of the total pore volume of the matrix. Because the electrolyte is melted during pretreatment of the fuel cell and pores are formed at the melted sites, the pore size of the matrix can be primarily controlled by controlling the size of the electrolyte particles.

In a preferred embodiment of the present invention, in order to improve the performance of the electrolyte, carbonates of one or more elements selected from the group consisting of Rb, Cs, Mg, Sr, Gd, Ba and Ca may be added to two or more carbonates selected from the group consisting of $Li_2CO_3$, $K_2CO_3$ and $Na_2CO_3$ in an amount of 1-15 wt % in view of the melting temperature, volume expansion and electrical properties of the electrolyte. However, an additional carbonate may not be added.

In a preferred embodiment of the present invention, the electrolyte that is used in the preparation of the matrix may be prepared by grinding each of the above-mentioned carbonates to a size of 0.1-1 μm and mixing the ground carbonates with each other. Alternatively, the electrolyte may be prepared by mixing the carbonates with each other at a predetermined ratio, melting the mixture at a temperature higher than the eutectic point thereof to make a uniform salt, and then grinding the salt to a size of 0.1-1 μm.

In a preferred embodiment of the present invention, the reinforcing metal particles are mainly made of an alkali metal or a transition metal. The reinforcing metal particles react with the electrolyte after melting of the electrolyte so that they are converted into oxides while their volume is expanded, whereby these metal particles function to make the matrix denser. Specific examples of the reinforcing metal particles include aluminum, zinc, copper, chromium, manganese, zirconia, nickel particles, etc.

In one embodiment of the present invention, aluminum particles among the reinforcing metal particles react with $Li_2CO_3$ to form $LiAlO_2$ that is the main component of the matrix, and the volume thereof can be expanded by 26% as a result of the reaction.

In a preferred embodiment of the present invention, the reinforcing metal particles have a size of 0.1-100 μm.

In a preferred embodiment of the present invention, the metal particles added may have not only a single size, but also various sizes.

In a preferred embodiment of the present invention, the reinforcing metal particles may have various shapes, including sphere, rod, needle and plate shapes, or may be mesh-shaped.

In a preferred embodiment of the present invention, the reinforcing metal oxide particles that are used in the present invention may be alumina ($Al_2O_3$), ceria ($CeO_2$), zirconia ($ZrO_2$), titania ($TiO_2$) and the like, and Lanthanoid oxides, and may have a particle size of 0.1-100 μm.

In a preferred embodiment of the present invention, the size and content of the reinforcing metal oxide particles may be adjusted depending on the pore size distribution thereof, and the amount of reinforcing metal oxide particles added may be determined within the range of 5-50 wt % of the total weight of powder in the slurry.

In a preferred embodiment of the present invention, the reinforcing metal oxide particles may have various shapes, including sphere, rod, needle and plate shapes, or may be mesh-shaped.

In a preferred embodiment of the present invention, the binder that is used in the present invention may be one or a mixture of two or more selected from among vinyl-based binders, acrylic-based binders, cellulose-based binders, and resin-based binders, which can control the physical properties and porosity of the sheet. Specifically, the binder may be one or a mixture of two or more selected from the group consisting of PVB (polyvinyl butyral), PVA (polyvinyl alcohol), PVC (polyvinyl chloride), and PMMA (polymethylmethacrylate).

The binder can agglomerate with the powder slurry. In order to avoid this phenomenon, in the present invention, the plasticizer and the antifoaming agent are dissolved in a solvent through a secondary ball milling process to form a binder solution, and the binder solution is mixed with the sufficiently ball-milled powder slurry, and the mixture is additionally ball-milled.

In a preferred embodiment of the present invention, ball milling of the mixture can be carried out until optimum dispersion can be achieved, depending on the measured viscosity of the slurry.

In a preferred embodiment of the present invention, the defoaming process can be carried out until the viscosity of the slurry can reach the range of 8000-20000 cPs.

In a preferred embodiment of the present invention, the slurry can be shaped into a plate-shaped, continuous sheet shape by a tape casting process.

In a preferred embodiment of the present invention, the sheet manufactured by the tape casting process is finally subjected to a drying process, thereby manufacturing a reinforced matrix impregnated with the electrolyte. In this regard, the drying process can be carried out by hot air or bottom heating.

The solvent, the dispersant, the plasticizer, the antifoaming agent and the binder, which are used in the present invention, may be those that are conventionally used in the tape casting process.

Specifically, the solvent that is used in the present invention may be one or a mixture of two or more selected from the group consisting of cyclohexanone, ethyl alcohol, toluene, methyl ethyl ketone, isopropyl alcohol, and xylene.

Specifically, the plasticizer that is used in the present invention may be one or a mixture of two or more selected from the group consisting of phtalate-based (n-butyl phtalate, or butyl benzyl phtalate), glycerine-based and glycol-based plasticizers.

MODE FOR INVENTION

Hereinafter, the construction and effect of the present invention will be described in further detail with reference to examples, but these examples are for illustrative purposes only, and the scope of the present invention is not limited thereto.

Examples 1 to 3

Fabrication of Electrolyte-Impregnated, Reinforced Matrix Using Reinforcing Metal Particles Together with Reinforcing Oxide Particles According to the composition ratio in Table 1 below, the following components were prepared: a mixed solvent of ethyl alcohol and toluene (ethyl alcohol:toluene=7:3 w/w) as a solvent; $LiAlO_2$ powder as the main component of a matrix; $Li_2CO_3$ and $K_2CO_3$ as an electrolyte; commercial dispersant SN-D348 as a dispersant; 3-μm Al particles as reinforcing metal particles; and 10-μm $Al_2O_3$ particles, 20-μm $ZrO_2$ particles or 30-μm $CeO_2$ particles as reinforcing oxide particles. The above components were mixed with each other and ball-milled, thus preparing powder slurry. In this regard, the electrolyte was prepared by grinding each of $Li_2CO_3$ and $K_2CO_3$ to a size of 1 to or less and mixing the ground materials with each other at a ratio of 70 mol %:30 mol % and was used in an amount corresponding to 40 vol % of the total pore volume of a matrix to be manufactured.

Meanwhile, in a separate process, based on 100 wt % of the total weight of the powder slurry resulting from the ball milling, 19 wt % of a mixed solvent of ethyl alcohol and toluene (ethyl alcohol:toluene=7:3 w/w) as a solvent, 4.2 wt % of BBP as a plasticizer, 0.5 wt % of commercial antifoaming agent SN-348 as an antifoaming agent, and 6.5 wt % of PVB as a binder were mixed with each other and ball-milled, thus preparing a binder solution.

The above-obtained powder slurry and the above-obtained binder solution were mixed with each other, and the mixture was ball-milled. The resulting slurry was adjusted to a viscosity of 8,000-20,000 cPs and defoamed through a defoaming process, after which the defoamed slurry was tape-cast on a film using a doctor blade, and then dried by hot air, thereby manufacturing matrices.

The pore size distribution of each of the manufactured matrices was analyzed.

Figure 2:
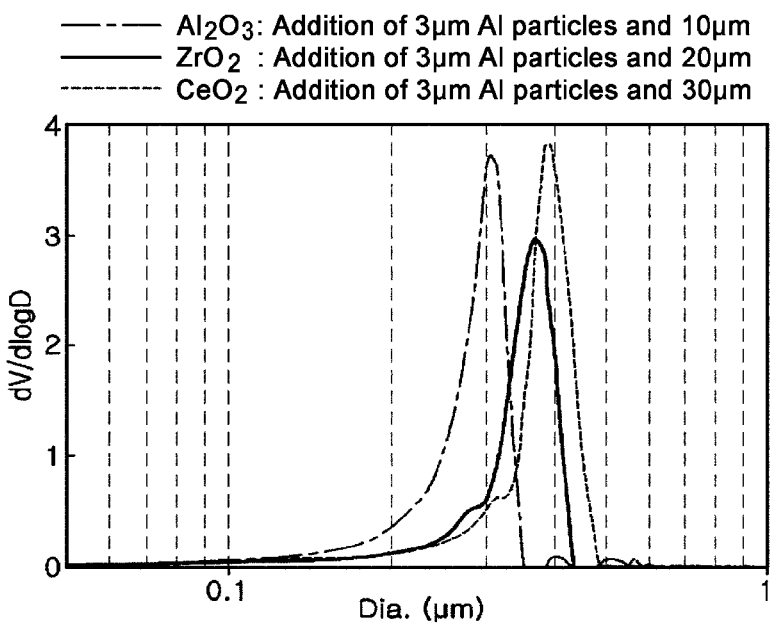
FIG. 2 shows the pore size distribution of an electrolyte-impregnated, reinforced matrix manufactured according to the present invention, as function of the kind and size of reinforcing particles in the matrix.

The analysis results are shown in FIG. 2. As can be seen therein, the main peak changed depending on the kind and particle size of the reinforcing particles, but an excellent result of 0.6 μm or less was shown.

TABLE 1

Composition Ratio of Components Used to Prepare Powder Slurry (unit: wt %)

| | Example 1 | Example 2 | Example 3 |
|---|---|---|---|
| Solvent | 40.0 | 40.0 | 40.0 |
| Dispersant | 1.4 | 1.3 | 1.2 |
| $LiAlO_2$ | 28.8 | 32.2 | 32.5 |
| $Li_2CO_3$ | 11.2 | 8.7 | 8.1 |
| $K_2CO_3$ | 9.0 | 7.0 | 6.5 |
| 3-μm Al | 3.3 | 4.2 | 4.9 |
| 10-μm $Al_2O_3$ | 6.3 | 0 | 0 |
| 20-μm $ZrO_2$ | 0 | 6.6 | 0 |
| 30-μm $CeO_2$ | 0 | 0 | 6.8 |
| Total | 100 | 100 | 100 |

Experimental Example 1

Differential Pressure Test of Reinforced Matrix of the Present Invention

Each of the matrix reinforced with 3-μm aluminum particles and the matrix reinforced with 10-μm alumina particles, manufactured in Example 1, was subjected to a differential pressure test.

The differential pressure test was carried out using a single-cell system, in which the gas composition of an anode outlet was analyzed by GC while adjusting the pressure of a cathode outlet, and the durability of the matrix was evaluated based on whether $N_2$ gas was detected.

Figure 3:
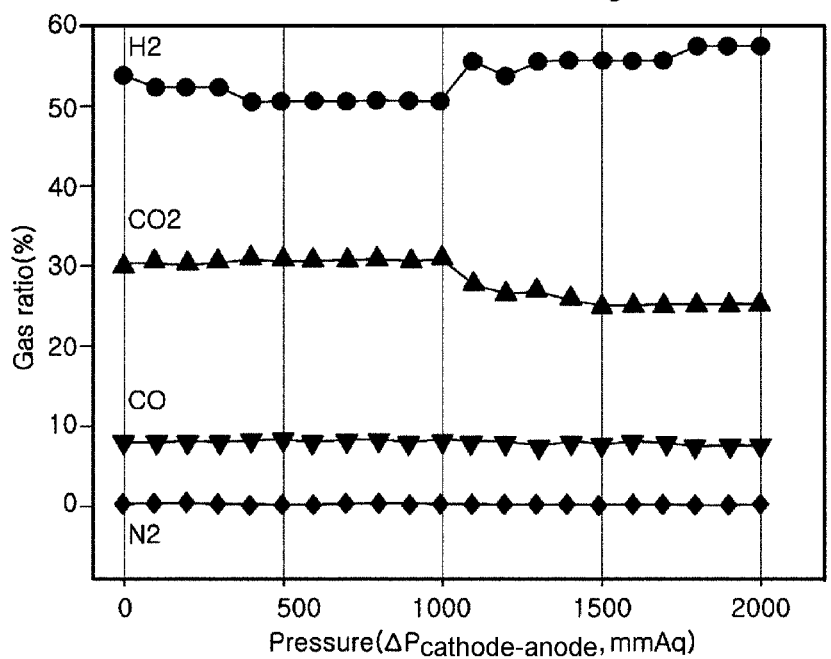
FIG. 3 is a graph showing the results of carrying out a differential pressure test of each of an electrolyte-impregnated matrix reinforced with 3-μm-size aluminum particles and an electrolyte-impregnated matrix reinforced with 10-μm-size alumina particles.

The test results are shown in FIG. 3 which shows the results of detection of $N_2$ gas in the anode outlet in a normal state in the pressure range from 0 to 2000 mmaq. As can be seen in FIG. 3, the reinforced matrix showed no detection of $N_2$ gas in both the OCV state and the normal state even at a pressure of 2000 mmaq which is much higher than the design reference value of differential pressure, indicating that the reinforced matrix has excellent durability.

INDUSTRIAL APPLICABILITY

As described above, according to the present invention, the electrolyte-impregnated matrix, which comprises both the electrolyte and the reinforcing particles including a metal and an oxide, is manufactured by adding the electrolyte, as required per unit cell of a fuel cell, and the reinforcing particles including the metal and the oxide, to a slurry during the matrix preparation step, and subjecting the resulting slung to a tape casting process. By doing so, as described in the above Examples, the matrix stacking operation is facilitated, and the matrix manufacturing process is simplified. In addition, cracking caused by the difference in thermal expansion coefficient between the electrolyte sheet and the matrix can be suppressed, and thermal shock occurring during operation of the fuel cell stack can be reduced, thus improving the performance and lifetime of the fuel cell. Having such excellent effects, the present invention will be very useful in the fuel cell industry.

The invention claimed is:

1. An electrolyte-impregnated, reinforced matrix for molten carbonate fuel cells, comprising:
   $LiAlO_2$ as a main component;
   an electrolyte;
   reinforcing metal particles of at least one metal selected from among alkali metals and transition metals; and
   reinforcing metal oxide particles within a range of 5-50 wt % of a total weight of powder in the matrix,
   wherein the electrolyte has a particular diameter of 0.1-1 μm melted and reacting with the reinforcing metal particles to produce fine pores of 0.1-0.5 μm, the fine pores preventing the production and progress of large cracks,
   wherein the reinforcing metal particles are made of one of aluminum, zinc, copper, or a combination of two or more thereof, and
   wherein the reinforcing metal oxide particles are made of one of alumina ($Al_2O_3$), ceria ($CeO_2$), zirconia ($ZrO_2$), titania ($TiO_2$) or a combination of two or more thereof, and
   wherein the reinforcing metal particles have a size of 0.1-100 μm.

2. The electrolyte-impregnated, reinforced matrix of claim 1, wherein the electrolyte is a mixture of two or more carbonates selected from the group consisting of $Li_2CO_3$, $K_2CO_3$ and $Na_2CO_3$.

3. The electrolyte-impregnated, reinforced matrix of claim 2, wherein the electrolyte additionally comprises one or more carbonates of one or more elements selected from the group consisting of Rb, Cs, Mg, Sr, Gd, Ba and Ca.

4. The electrolyte-impregnated, reinforced matrix of claim 1, wherein the reinforcing metal particles are sphere-shaped, rod-shaped, needle-shaped or plate-shaped.

5. The electrolyte-impregnated, reinforced matrix of claim 1, wherein the reinforcing metal oxide particles have a size of 0.1-100 μm.

6. The electrolyte-impregnated, reinforced matrix of claim 1, wherein the reinforcing metal oxide particles are sphere-shaped, rod-shaped, needle-shaped or plate-shaped.

7. A method of manufacturing an electrolyte-impregnated, reinforced matrix for molten carbonate fuel cells, the method comprising the steps of:
   mixing $LiAlO_2$, an electrolyte comprising fine electrolyte powder having a particle diameter of 0.1-1 μm melted and reacting with reinforcing metal particles to produce fine pores of 0.1-0.5 μm, the fine pores preventing the production and progress of large cracks, a dispersant, the reinforcing metal particles made of aluminum, zinc, copper, or a combination of two or more thereof and reinforcing metal oxide particles having a size of 0.1-100 μm made of alumina ($Al_2O_3$), ceria ($CeO_2$), zirconia ($ZrO_2$), titania ($TiO_2$) or a combination of two or more thereof in a solvent to prepare a first mixture, and ball-milling the first mixture to prepare a powder slurry, wherein the reinforcing metal oxide particles are provided within a range of 5-50 wt % of a total weight of powder in the matrix;
   dissolving a plasticizer, an antifoaming agent and a binder in a solvent to prepare a second mixture, and ball-milling the second mixture to prepare a binder solution;
   mixing the powder slurry and the binder solution to prepare a third mixture, and ball-milling the third mixture to prepare a slurry;
   defoaming the slurry obtained by ball-milling the third mixture;
   shaping the defoamed slurry;
   and drying the shaped slurry.

8. The method of claim 7, wherein the defoamed slurry is shaped by tape casting.

9. The method of claim 7, wherein the drying is carried out by hot air or bottom heating.

* * * * *